(12) United States Patent
Tweet et al.

(10) Patent No.: US 7,900,333 B2
(45) Date of Patent: Mar. 8, 2011

(54) SEALING BLADDERLESS SYSTEM AND METHOD

(75) Inventors: Tracy L. Tweet, Stanwood, WA (US); Mark A. Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 747 days.

(21) Appl. No.: 11/740,753

(22) Filed: Apr. 26, 2007

(65) Prior Publication Data

US 2008/0264951 A1 Oct. 30, 2008

(51) Int. Cl.
B21D 39/03 (2006.01)

(52) U.S. Cl. .. 29/428; 29/426.5; 244/135 R; 220/560.01; 220/560.02; 277/645; 277/646

(58) Field of Classification Search .................... 29/428, 29/426.5; 244/135 B, 135 R; 220/560.02, 220/560.01, 585, 586, 581, 62.22, 62.11; 277/645, 646, 605, 650, 934, 316
See application file for complete search history.

(56) References Cited

U.S. PATENT DOCUMENTS

| 2,404,418 | A | * | 7/1946 | Walker | 220/88.1 |
| 2,407,515 | A | * | 9/1946 | Roberts | 220/560.02 |
| 3,675,809 | A | * | 7/1972 | McGrew et al. | 220/560.13 |
| 3,737,125 | A |   | 6/1973 | Farmer |   |
| 3,787,279 | A | * | 1/1974 | Winchester | 220/560.02 |
| 3,980,106 | A | * | 9/1976 | Wiggins | 138/140 |
| 4,925,057 | A |   | 5/1990 | Childress et al. |   |
| 5,383,567 | A |   | 1/1995 | Sorathia |   |

FOREIGN PATENT DOCUMENTS

| GB | 147314 A | 7/1920 |
| WO | WO2006/076030 | 7/2006 |

OTHER PUBLICATIONS

The Boeing Company—International Search Report—International Application No. PCT/US2008/058205 dated Aug. 19, 2008.

* cited by examiner

*Primary Examiner* — David P Bryant
*Assistant Examiner* — Bayan Salone
(74) *Attorney, Agent, or Firm* — Klintworth & Rozenblat IP LLC

(57) ABSTRACT

Apparatus and methods are provided to minimize the escape of fuel out of a fuel tank when a tank wall is penetrated by a bullet. In one embodiment, a pressure differential may be maintained between a pressure within a fuel tank cavity and another pressure outside the fuel tank cavity in order to minimize the loss of fuel upon penetration of the fuel tank. In another embodiment, a compressed rubber layer of fuel-reactive rubber may be provided which is adapted to be attached to a fuel tank wall and to swell upon contact with fuel in order to substantially seal a penetrated hole in the fuel tank wall.

15 Claims, 8 Drawing Sheets

US 7,900,333 B2

SEALING BLADDERLESS SYSTEM AND METHOD

BACKGROUND

A variety of apparatus and methods exist for sealing a hole in a fuel tank of an aircraft or device which was created due to the penetration of a bullet or other object. For instance, one existing self-sealing fuel tank utilizes a bladder contained within a box or airframe structure. The bladder may have a layer of fuel-reactive rubber compound sandwiched between layers of fuel compatible rubber compound. Once penetrated by a projectile, the reactive layer is exposed to the fuel and it swells, eventually substantially closing the hole. However, self-sealing fuel tanks with bladders may have limitations such as excessive weight, non-immediate sealing, durability issues, maintenance difficulty, fuel drainage after penetration, reliability issues, safety issues, manufacture complexity, excessive cost, installation difficulties, inspection difficulties, repair difficulties, necessary tank design alterations, and/or may experience one or more other types of problems.

An apparatus and/or method for sealing a penetration hole in a fuel tank of an aircraft or other device is needed to decrease one or more problems associated with one or more of the existing apparatus and/or methods.

SUMMARY

In one aspect of the disclosure, a fuel tank for a device is provided. The fuel tank comprises a tank wall and a fuel holding cavity defined by the tank wall. At least one of a first pressure, which is outside the fuel holding cavity and the tank wall, and a third pressure, which is within an interstitial cavity of the tank wall and outside of the fuel cavity, is maintained higher than a second pressure within the fuel holding cavity so that a penetration of the tank wall will cause air to flow into the fuel holding cavity at a rate to substantially minimize the escape of fuel out of a hole created by penetration of the tank wall.

In another aspect of the disclosure, a compressed rubber layer of fuel-reactive rubber is provided which is adapted to be attached to a wall of a fuel tank and to swell upon contact with fuel in order to substantially seal a penetrated hole in a wall of a fuel tank.

In a further aspect of the disclosure, a method is provided for substantially minimizing the escape of fuel from a fuel tank upon penetration. In one step, a fuel tank for a device is provided. The fuel tank comprises a tank wall and a fuel holding cavity defined by the tank wall. In another step, a fuel-reactive rubber layer is compressed against the tank wall.

In yet another aspect of the disclosure, a method is provided for detecting and isolating a penetration in a fuel tank. In one step, a hole is sealed in an outer skin of a tank wall. In another step, a third pressure in an interstitial cavity within the tank wall is lowered. In still another step, fuel is drained through the interstitial cavity.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
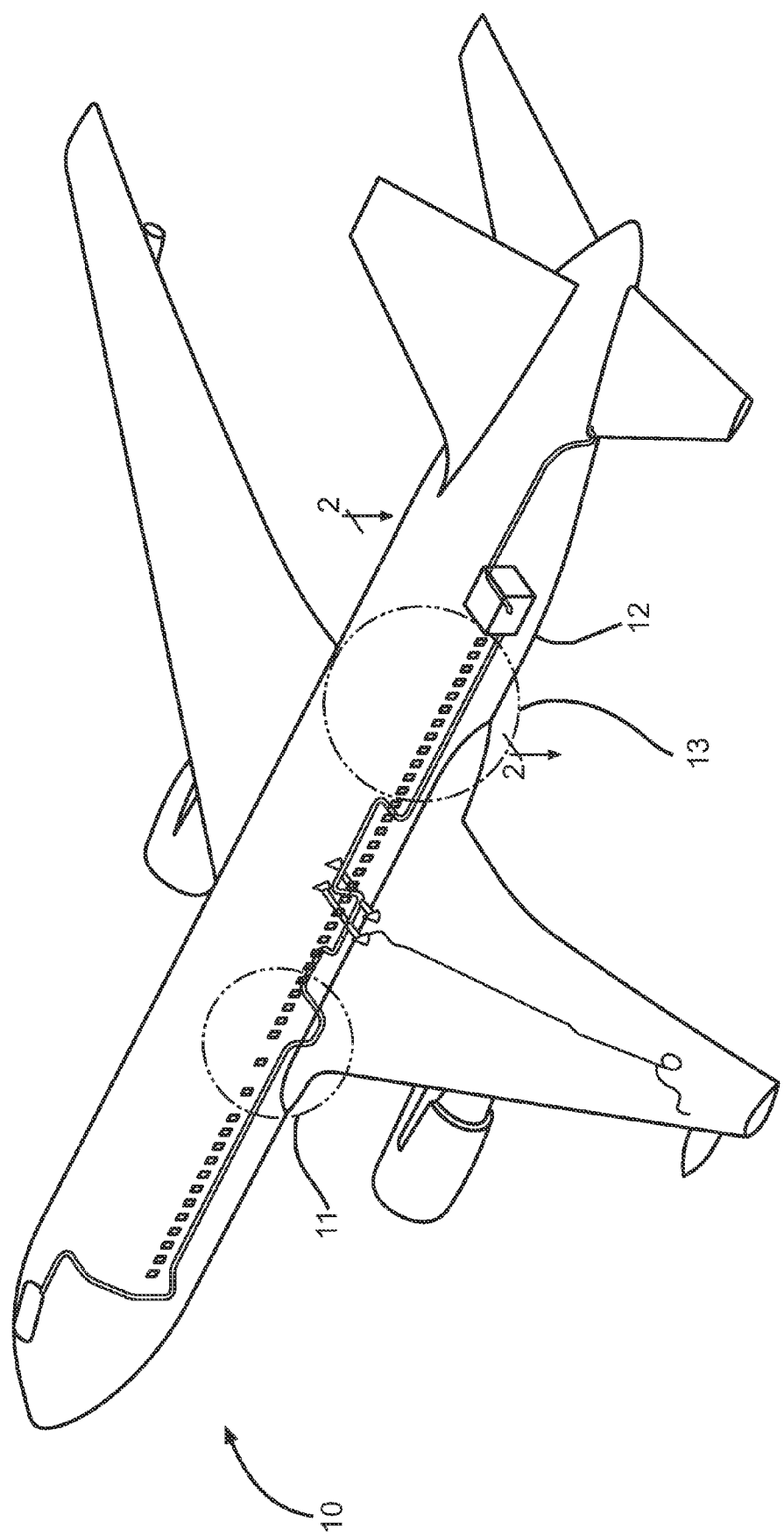
FIG. 1 shows a perspective view of one embodiment of an aircraft having fuel tanks to which the systems and methods of the disclosure may be applied to substantially minimize the escape of fuel from the fuel tanks upon penetration by a bullet.
Figure 2:
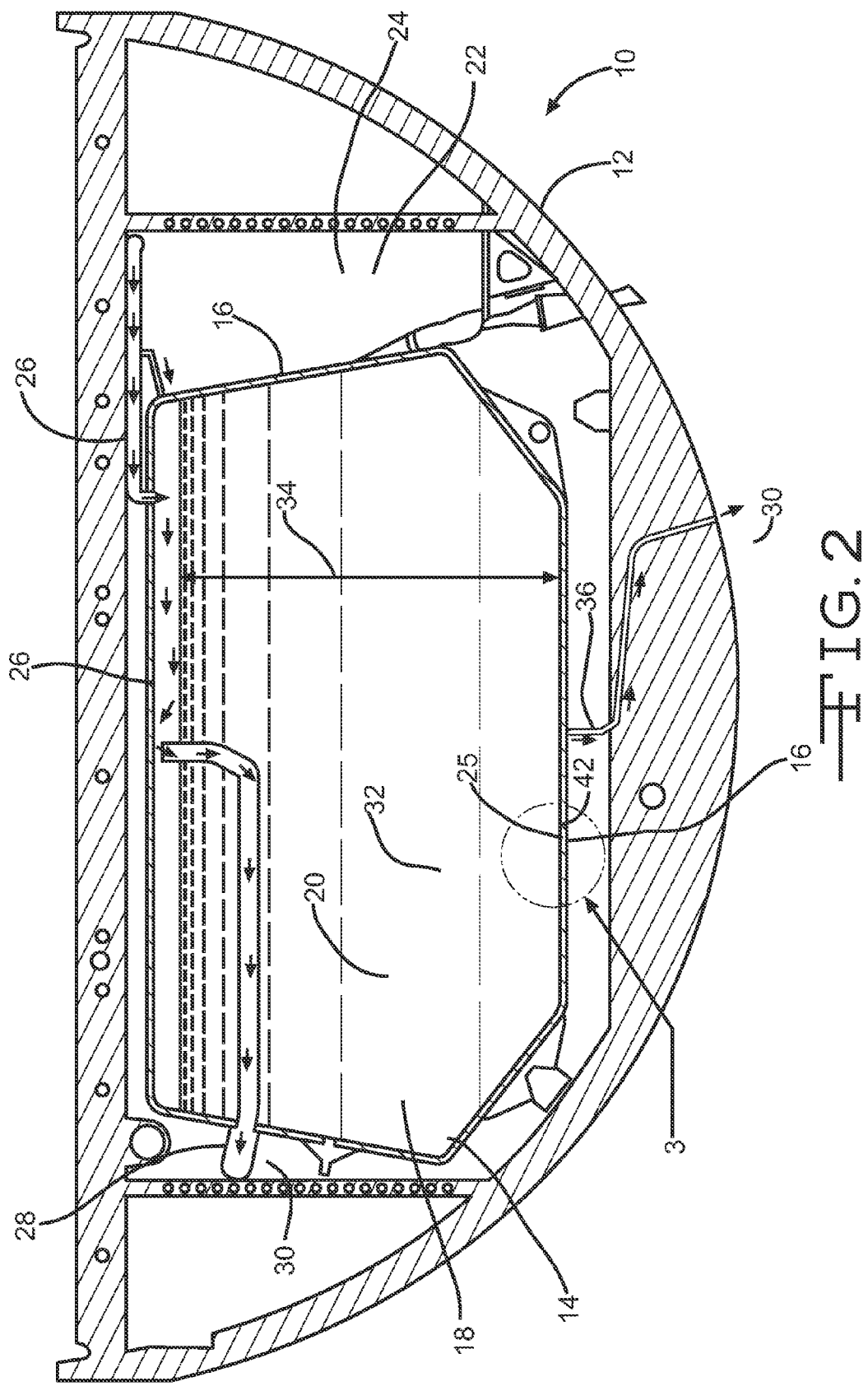
FIG. 2 shows a partial cross-sectional view through line 2-2 of the embodiment of FIG. 1.

FIG. 1 shows a perspective view of one embodiment of an aircraft 10 having fuel tanks (not shown) at locations 11 and 13 to which the systems and methods of the disclosure, which may be used to substantially minimize the escape of fuel from a fuel tank upon penetration, may be applied. In other embodiments, the systems and methods of the disclosure may be applied to any type of device including other types of aircraft, any type of vehicle, or to a non-vehicle structure. FIG. 2 shows a partial cross-sectional view through line 2-2 of the embodiment of FIG. 1. Within the outer skin 12 of the aircraft 10 may be a removable fuel tank 14. In other embodiments, a non-removable fuel tank 14 may be utilized.

The fuel tank 14, which is bladderless, may include a tank wall 16 and a fuel holding cavity 18 defined by the tank wall 16 holding fuel 20. The cabin 22 of the aircraft 10 may have a regulated first pressure 24 which is both outside of the fuel holding cavity 18 and outside of the tank wall 16. Within an interstitial cavity 42 of the tank wall 16, and outside of the fuel holding cavity 18, may be a regulated third pressure 25. A pressure line 26 may extend into the fuel holding cavity 18 and a vent line 28, which may be vented to the ambient 30, may extend out of the fuel holding cavity 18. In such manner, a second pressure 32 within the fuel holding cavity 18 may be regulated. The second pressure 32 within the fuel holding cavity 18 may be substantially equal to the first pressure 24 minus the sum of 2 pounds per square inch gauge plus head pressure 34 within the fuel holding cavity 18. In other embodiments, the second pressure 32 within the fuel holding cavity 18 may be a variety of pressures. A cavity drain 36 may extend from the tank wall interstitial cavity 42 to the ambient 30.

Figure 3:
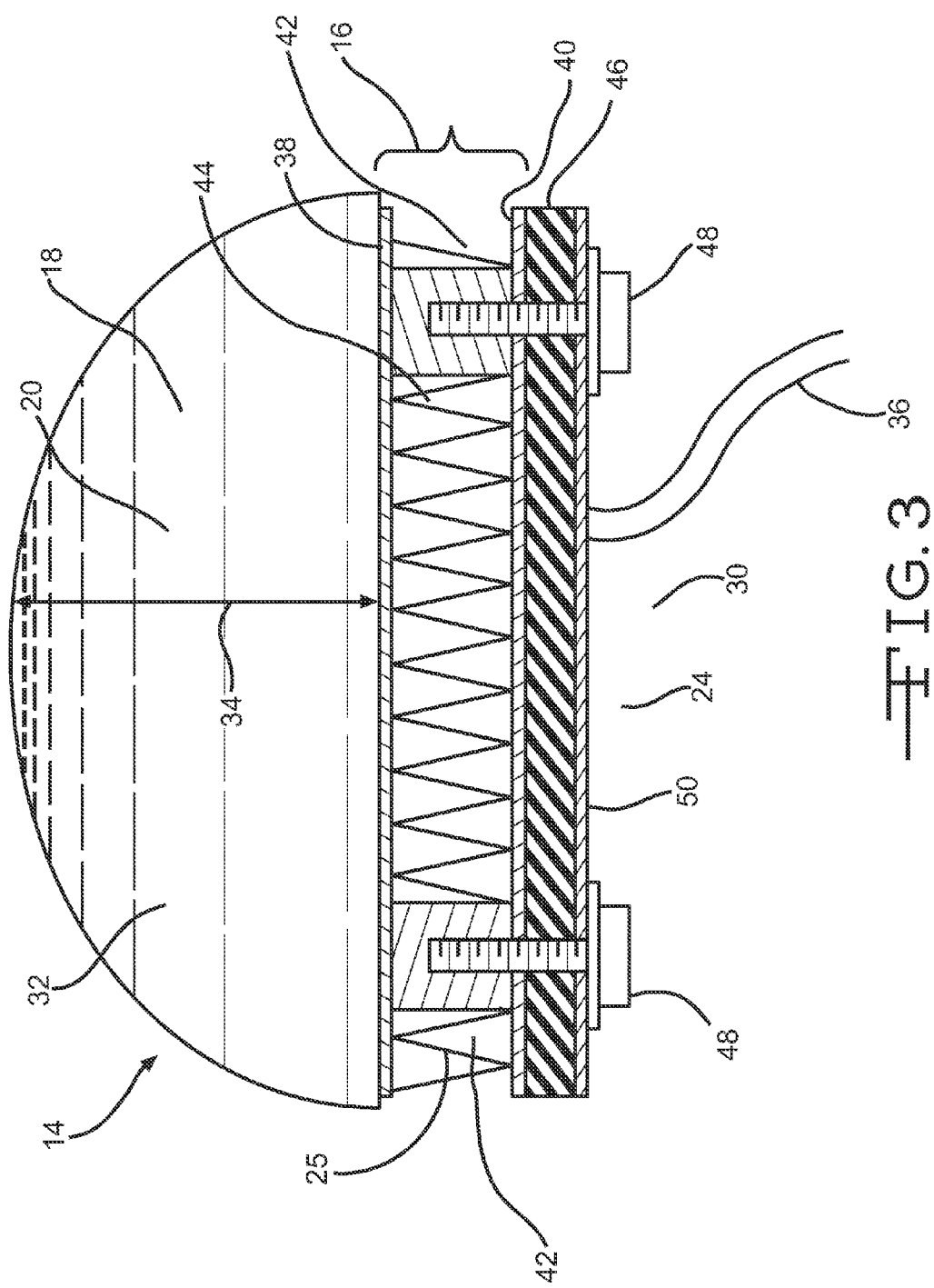
FIG. 3 shows a view within circle 3 of the embodiment of FIG. 2.

FIG. 3 shows a view within circle 3 of the embodiment of FIG. 2. The tank wall 16 may comprise an inner wall 38, an outer wall 40, and a tank wall interstitial cavity 42 defined between the inner and outer walls 38 and 40. A hollow, honeycomb core structure 44 may be contained within the tank wall interstitial cavity 42 which may be ported (vented) for air flow and fuel drainage throughout the honeycomb core structure 44. The tank wall 16 is bladderless. A compressed rubber layer of fuel reactive rubber 46, which may be adapted to swell upon contact with fuel in order to substantially seal a penetrated hole in a portion of tank wall 16, may be attached to outer wall 40 of tank wall 16 using fasteners 48. Due to the compressed rubber layer 46 being attached to outer wall 40, such that it may seal a penetration in the outer wall 40, the fuel tank 14 may be adapted to drain fuel 20 out of the fuel holding cavity 18 through the inner wall 38 and out of a drainage system 36 when a first pressure 24 is reduced or removed.

The compressed rubber layer 46 may be adapted to quickly expand after being penetrated, even after being compressed for substantial time, and to absorb fuel and swell due to its fuel-reactive material. The compressed rubber layer of fuel reactive rubber 46 may be substantially uniformly compressed due to backing member 50, which may be made of Kevlar or other material which will not produce a flowering of material into the rubber layer of the backing member 50 at a penetrated hole and whose properties minimize the size of an open hole produced by a penetrating projectile. The backing member 50 may be fastened to the compressed rubber layer 46 using fasteners 48 extending into the outer wall 40 of tank wall 16. The compressed rubber layer 46 and backing member 50 may be sealed around their peripheries to lock in sea level pressure.

The compressed rubber layer 46 and backing member 50 may be permanently attached to the outer wall 40 of tank wall 16, or removably attached in such a manner to facilitate inspection of the underlying outer wall 40, without affecting structural design of the fuel tank 14 and without acting as load-carrying members. The compressed rubber layer and backing member 50 may be shaped to allow for cutouts at access hatches and doghouse access panels, which may be covered by separate Kevlar and rubber panels that are individually removable for maintenance access. The compressed rubber layer 46 may be in the form of a sponge, a foam, a natural latex, or in other embodiments, other type of compressible, yet resilient material including non-rubber materials. In other embodiments, the compressed rubber layer 46 may be adapted to be used in conjunction with one or more non-reactive material layers and/or other fuel reactive layers made of varying materials to achieve optimal expansion into a penetration.

At least one of a first pressure 24, which is both outside of the fuel holding cavity 18 and outside of the tank wall 16, and a third pressure 25 inside the tank wall interstitial cavity 42 within the tank wall 16, may be maintained at a higher pressure than a second pressure 32 within the fuel holding cavity 18 so that a penetration of a portion of the tank wall 16 by a bullet or other penetrating object may cause air to flow into the fuel holding cavity 18 at a rate sufficient to substantially minimize the escape of fuel 20 out of a hole created by the penetration. The third pressure 25 may be equal to or slightly below the first pressure 24. In one embodiment, both the first pressure 24 and the third pressure 25 may be maintained at a higher pressure than the second pressure 32. The first pressure 24, may substantially comprise a fuel head pressure 34 within the fuel holding cavity 18 plus 2 pounds per square inch gauge above the second pressure 32. The third pressure 25 may be supplied by an inerting system which produces a nitrogen-rich air mixture, or may be supplied by another type of system producing a different type of air mixture. The second pressure 32 may be obtained by controlled venting of the fuel holding cavity 18 to the ambient 30.

Figure 4:
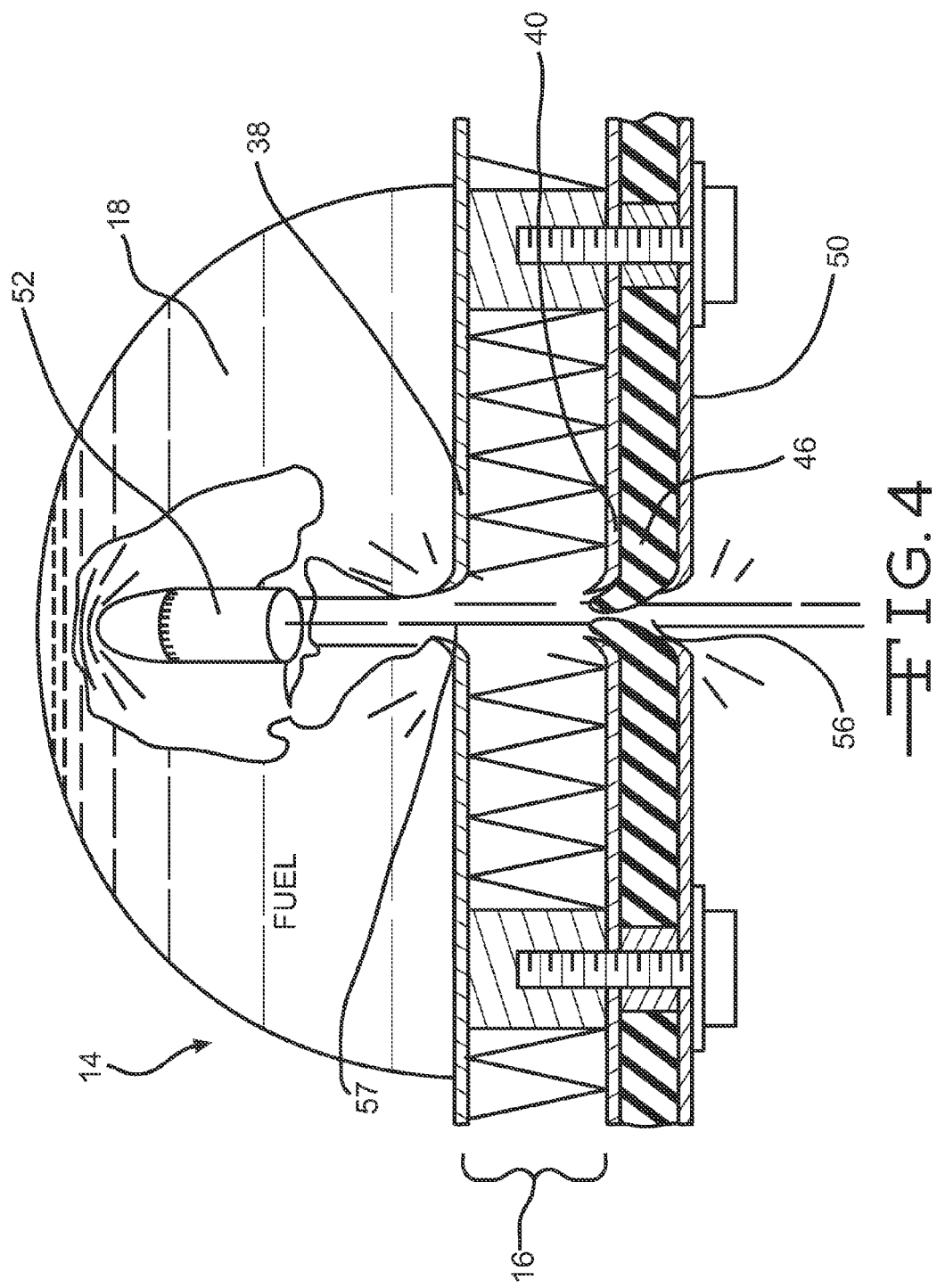
FIG. 4 shows a bullet penetrating the embodiment of FIG. 3.
Figure 5:
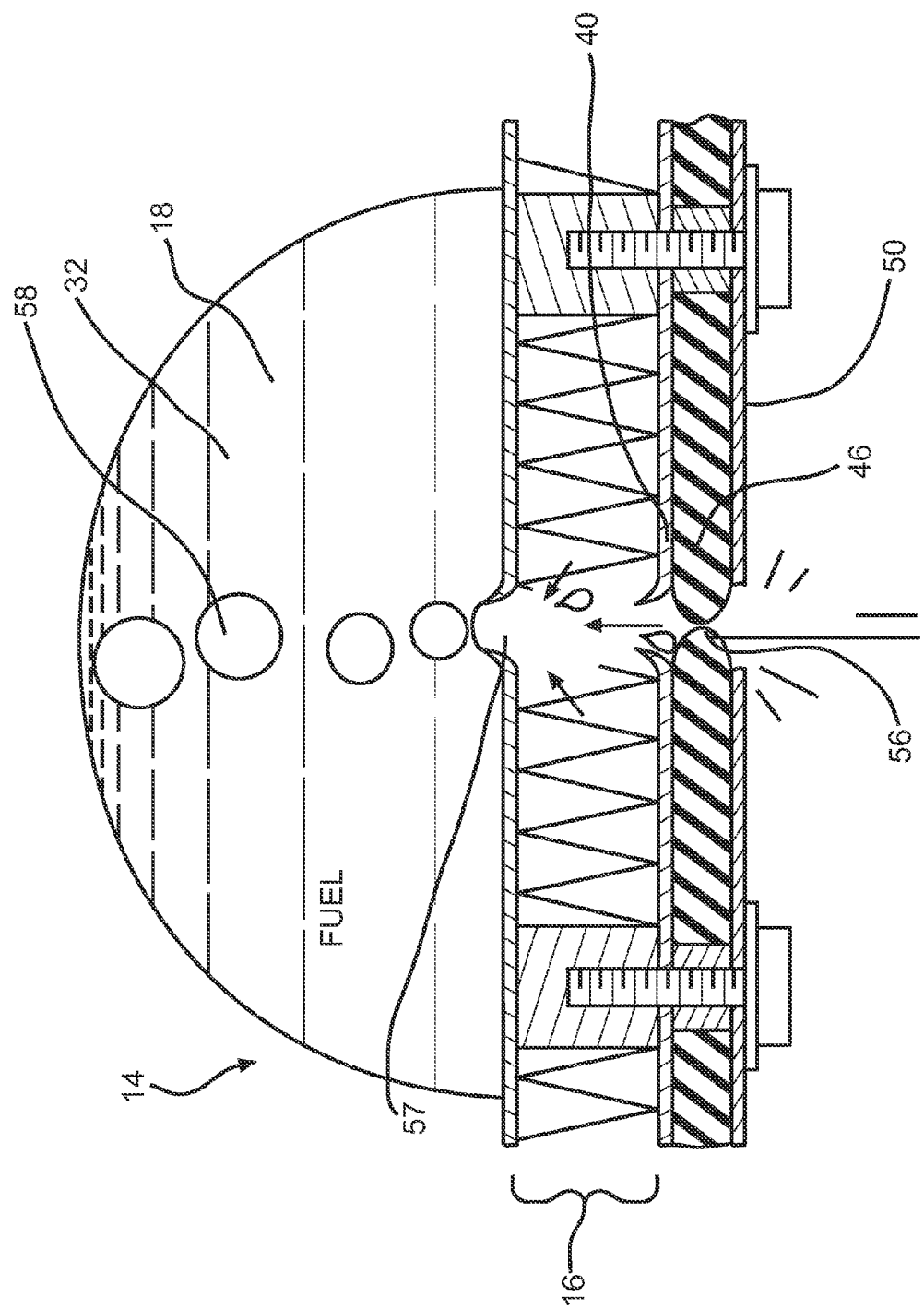
FIG. 5 shows the embodiment of FIG. 4 immediately after penetration.

FIG. 4 shows a bullet 52 penetrating the embodiment of FIG. 3. In other embodiments, the penetrating object may be a .5 caliber bullet or other type and/or sized penetrating object. In particular, the bullet 52 is shown penetrating the backing member 50, the compressed rubber layer 46, the inner and outer walls 38 and 40 of the tank wall 16, and entering the fuel holding cavity 18. FIG. 5 shows the embodiment of FIG. 4 immediately after penetration. As shown, due to the bullet 52 shearing off a portion 54 of the compressed rubber layer 46, the surrounding material of compressed rubber layer 46 expands into the hole 56 created in the compressed rubber layer 46 by the penetrating bullet 52. Some of the fuel 58 is shown splashing onto the compressed rubber layer 46 which has expanded into the hole 56. The first pressure 24, which is greater than the second pressure 32 within the fuel holding cavity 18, forces air 58 to bleed through the holes 56 and 57 and into the fuel holding cavity 18 thereby substantially minimizing the leakage of fuel 20 through the holes 56 and 57. Simultaneously, the third pressure 25, which also is greater than the second pressure 32 within the fuel holding cavity 18, forces air or a nitrogen enriched air 58 to bleed through the hole 57 in the tank inner wall 38.

Figure 6:
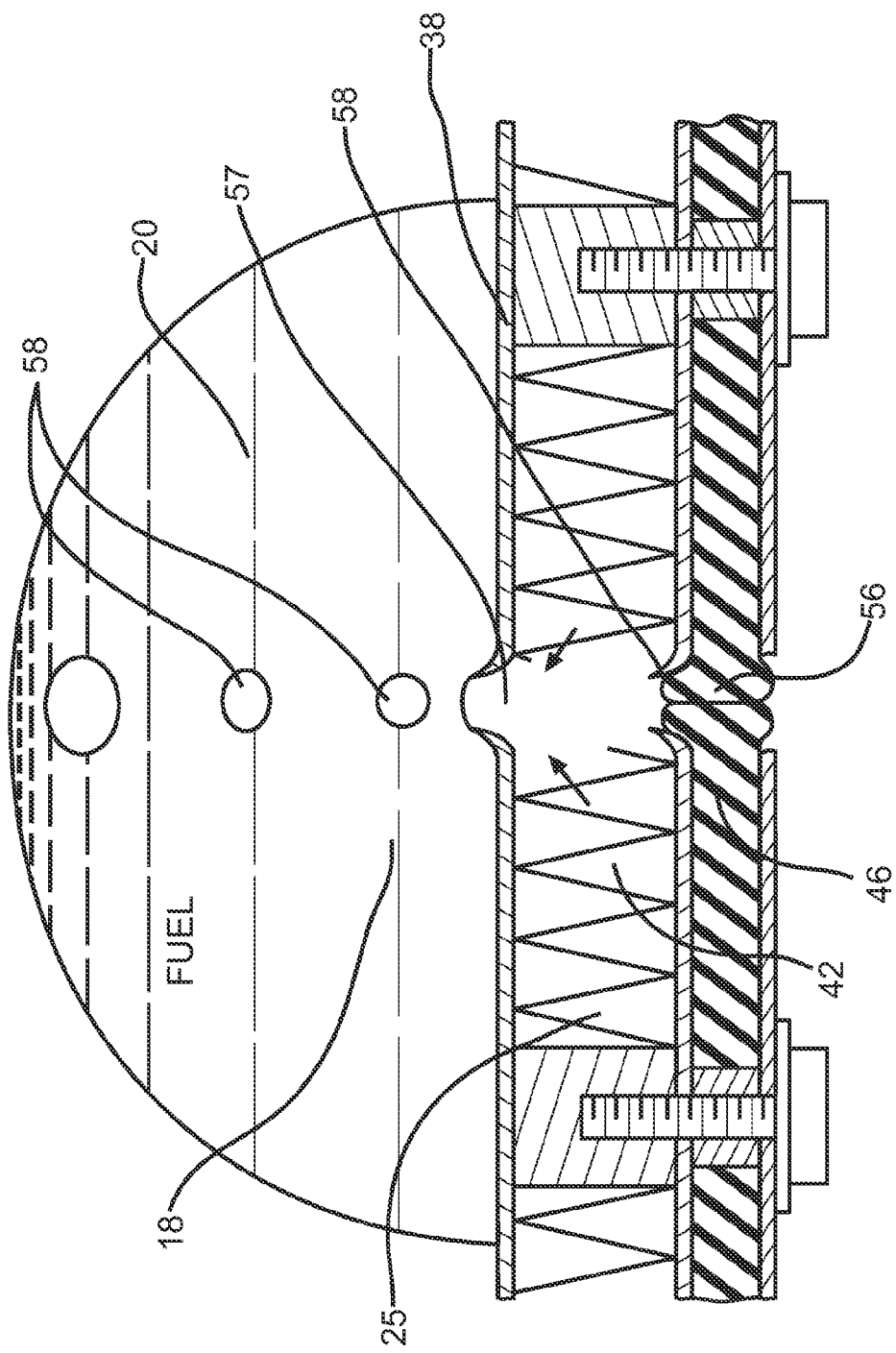
FIG. 6 shows the embodiment of FIG. 5 after fuel has splashed onto a compressed rubber layer which has expanded into a hole created by the penetrating bullet.
Figure 7:
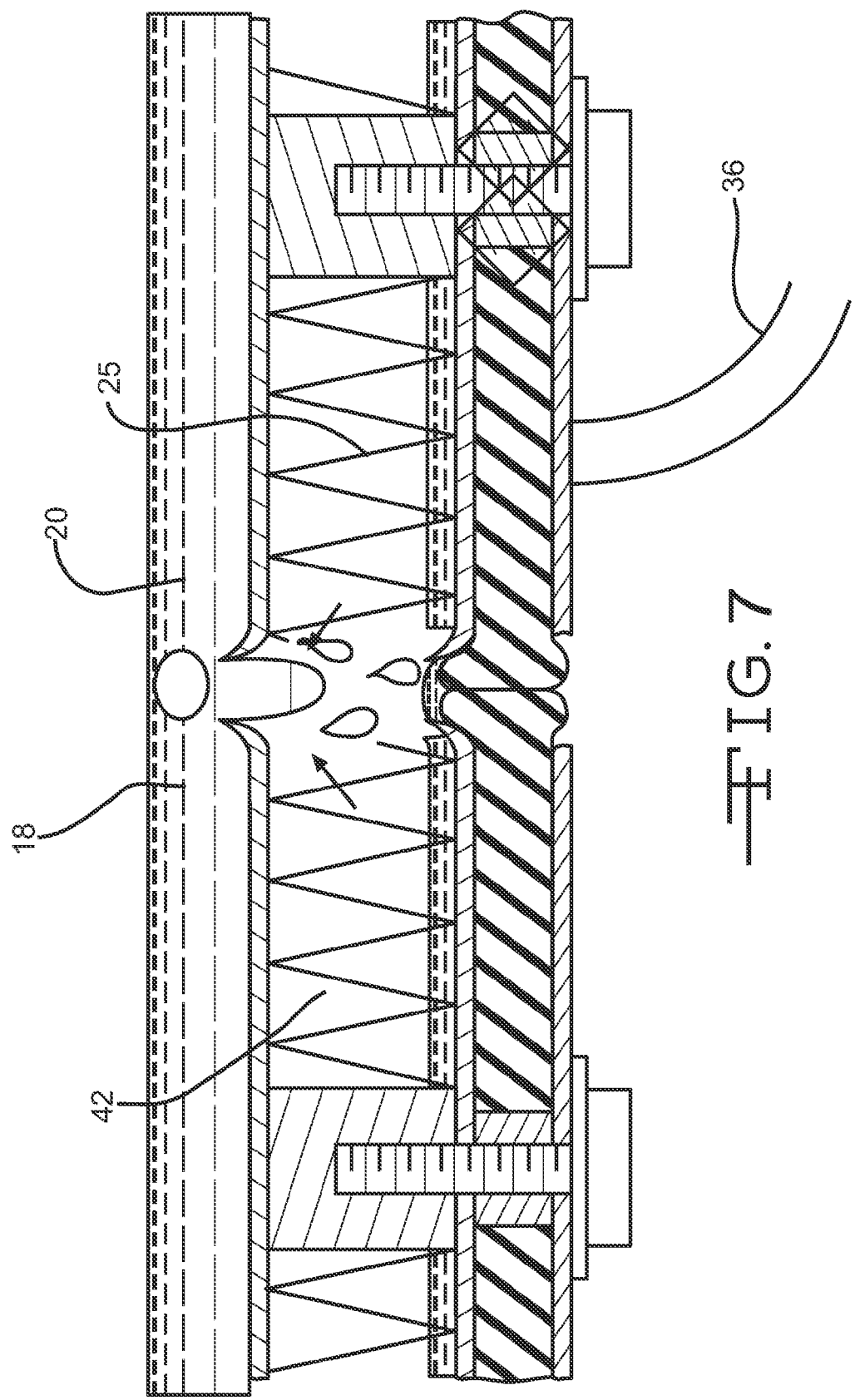
FIG. 7 shows the embodiment of FIG. 6 after a pressure is lowered or removed from within a wall cavity to allow fuel to drain out of a fuel holding cavity into the wall cavity and out through a cavity drain line.

FIG. 6 shows the embodiment of FIG. 5 after fuel 58 has splashed onto the compressed rubber layer 46 in the hole 56. As shown, the compressed rubber layer 46 has swelled to substantially close the hole 56 in the compressed rubber layer 46 due to the fuel-reactive rubber 46 reacting to the splashing fuel 58. The third pressure 25 within the tank wall interstitial cavity 42 is still forcing air 58 to bleed through the remaining hole 57 in the inner tank wall 38 to substantially prevent fuel 20 from draining out of the fuel holding cavity 18 into the wall interstitial cavity 42. The third pressure 25 may be maintained during the rest of the aircraft's flight in order to substantially prevent fuel 20 from draining out of the fuel holding cavity 18. FIG. 7 shows the embodiment of FIG. 6 after the third pressure 25 is lowered or removed to allow the fuel 20 to drain out of the fuel holding cavity 18 into the tank wall interstitial cavity 42 and out of a cavity drain line 36. The third pressure 25 may be lowered or removed after the aircraft 10 lands and is safely on the ground.

Figure 8:
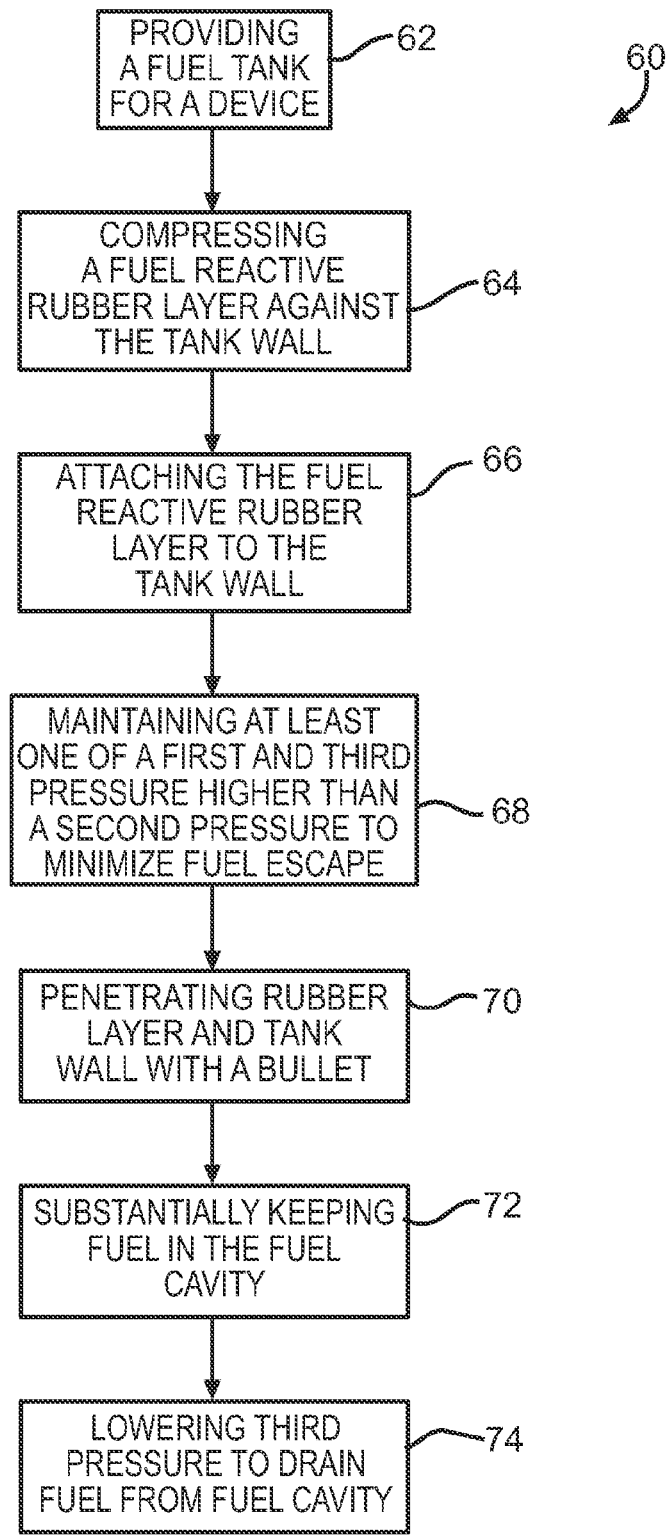
FIG. 8 is a flowchart showing one embodiment of a method for substantially minimizing the escape of fuel from a bladderless fuel tank.

FIG. 8 shows a flowchart of one embodiment of a method 60 for substantially minimizing the escape of fuel 20 from a bladderless fuel tank 14. In one step 62, a fuel tank 14 for a device is provided, such as for an aircraft 10 or other type of vehicle or structure. The fuel tank 14 may comprise a tank wall 16 and a fuel holding cavity 18 defined by the tank wall 16. In another step 64, a fuel-reactive rubber layer 46 may be compressed against the tank wall 16. The fuel-reactive rubber layer 46 and the tank wall 16 may comprise any of the embodiments disclosed herein. For instance, the fuel-reactive rubber layer 46 may be resilient and may comprise at least one of a sponge, a foam, and a natural latex. In one embodiment, the fuel-reactive rubber layer 46 may be compressed using a backing member 50 against an outer wall 40 of a tank wall 16 comprising an inner wall 38, an outer wall 40, and a tank wall interstitial cavity 42.

In another step 66, the fuel-reactive rubber layer 46 may be attached to the tank wall 16. In yet another step 68, at least one of a first pressure 24, which is both outside of the fuel holding cavity 18 and outside of the tank wall 16, and a third pressure 25 within an interstitial cavity 42 of the tank wall 16, may be maintained higher than a second pressure 32 within the fuel holding cavity 18 so that a penetration of the tank wall 16 will cause air 58 to flow into the fuel holding cavity 18 at a rate to substantially minimize the escape of fuel 20 out of a hole 56 created by penetration of the tank wall 16. In one embodiment, both the first pressure 24 and the third pressure 25 may be maintained higher than the second pressure 32. The first pressure 24 may comprise substantially a fuel head pressure 34 plus 2 pounds per square inch gauge above the second pressure 32. Likewise, the third pressure 25 may comprise substantially a fuel head pressure 34 plus 2 pounds per square inch gauge above the second pressure 32. In still another step 70, the compressed fuel-reactive rubber layer 46 and the tank wall 16 may be penetrated with a bullet 52 thereby creating a hole 56. In another step 72, fuel 20 may be substantially contained within at least one of the fuel holding cavity 18 and the tank wall interstitial cavity 42 as a result of air 58 flowing into the fuel holding cavity 18 and as a result of swelling of the fuel-reactive rubber layer 46 substantially sealing the hole 56 in the outer wall 40 of the tank wall 16. In yet another step 74, the third pressure 25 may be lowered in order to drain fuel 20 from the fuel holding cavity 18 through the interstitial cavity 42 to facilitate leak detection and isolation.

The disclosed embodiments may reduce one or more problems associated with one or more of the prior art systems and/or methods. For instance, one or more embodiments of the apparatus and/or methods herein disclosed may provide a fast sealing, durable, low maintenance, low fuel drainage after penetration, reliable, safe, easy to manufacture, lightweight, less costly, bladderless fuel tank which provides substantial protection against penetrating bullets, is easy to install, inspect, and/or repair, does not alter the design of the tank, causes less problems, and/or may reduce one or more other types of problems associated with one or more of the prior art apparatus and/or methods.

It should be understood, of course, that the foregoing relates to exemplary embodiments and that modifications may be made without departing from the spirit and scope of the disclosure as set forth in the following claims.

We claim:

1. A method for substantially minimizing the escape of fuel from a fuel tank upon penetration comprising:
   providing a fuel tank for a device, wherein the fuel tank comprises a tank wall and a fuel holding cavity defined by the tank wall;
   compressing a fuel-reactive rubber layer against the tank wall; and
   maintaining at least one of a first pressure, which is outside the fuel holding cavity and the tank wall, or a third pressure, which is within an interstitial cavity of the tank wall and outside of the fuel holding cavity, higher than a second pressure within the fuel holding cavity while maintaining the third pressure to be equal to or less than the first pressure so that a penetration of the tank wall will cause air to flow into the fuel holding cavity at a rate to substantially minimize the escape of fuel out of a hole created by penetration of the tank wall.

2. The method of claim 1 wherein the tank wall comprises an inner wall and an outer wall, the tank wall interstitial cavity is defined between the inner and the outer walls, and the fuel-reactive rubber layer is compressed against the outer wall.

3. The method of claim 1 wherein the device is at least one of a vehicle and an aircraft.

4. The method of claim 1 wherein the fuel tank is bladderless.

5. The method of claim 1 wherein the fuel-reactive rubber layer is compressed against an outer portion of the tank wall using a backing member.

6. The method of claim 1 further comprising the step of attaching the fuel-reactive rubber layer to the tank wall.

7. The method of claim 1 wherein the first pressure comprises substantially a fuel head pressure plus 2 pounds per square inch gauge above said second pressure.

8. The method of claim 1 wherein the third pressure comprises substantially or slightly less than a fuel head pressure plus 2 pounds per square inch gauge above said second pressure.

9. The method of claim 1 wherein the fuel-reactive rubber layer is adapted to swell upon contact with fuel in order to substantially seal a penetrated hole in the tank wall.

10. The method of claim 1 further comprising the steps of penetrating the compressed fuel-reactive rubber layer and the tank wall with a bullet thereby creating a hole, and substantially keeping fuel within at least one of the fuel holding cavity and the tank wall interstitial cavity as a result of air flowing into the fuel holding cavity, and as a result of swelling of the fuel-reactive rubber layer substantially sealing the hole.

11. The method of claim 10 further comprising the step of lowering said third pressure and draining the fuel from the fuel holding cavity.

12. The method of claim 1 wherein the fuel-reactive rubber layer is resilient and is at least one of a sponge, a foam, and a natural latex.

13. The method of claim 2 wherein the compressing step further comprises compressing the fuel-reactive rubber layer against the outer wall outside of the tank wall interstitial cavity.

14. The method of claim 13 wherein the tank wall comprises a hollow, honeycomb core structure disposed between the inner and the outer walls of the tank wall interstitial cavity.

15. The method of claim 13 wherein the compressing step further comprises compressing the fuel-reactive rubber layer against the outer wall outside of the tank wall interstitial cavity using a backing member so that the fuel-reactive rubber layer is compressed between the outer wall outside of the tank wall interstitial cavity and the backing member.

* * * * *